(12) United States Patent
Kurrat

(10) Patent No.: US 6,456,645 B1
(45) Date of Patent: Sep. 24, 2002

(54) DIGITAL WIRELESS AUDIO TRANSMISSION SYSTEM

(76) Inventor: Jens Kurrat, Annenstr. 26, Berlin 10179 (DE)

( * ) Notice: Subject to any disclaimer, the term of this patent is extended or adjusted under 35 U.S.C. 154(b) by 0 days.

(21) Appl. No.: 09/430,013

(22) Filed: Oct. 29, 1999

(30) Foreign Application Priority Data

Nov. 24, 1998 (DE) .......................................... 198 55 292

(51) Int. Cl.7 ............................................. H04L 27/32
(52) U.S. Cl. ....................... 375/140; 375/146; 375/147; 332/120; 455/102
(58) Field of Search ................................. 375/130, 140, 375/146, 147, 141, 267, 268, 300, 316, 320; 332/119, 120, 151; 455/102, 108, 118

(56) References Cited

U.S. PATENT DOCUMENTS

| | | | |
|---|---|---|---|
| 4,199,821 A | * | 4/1980 | Munday ...................... 332/120 |
| 4,977,578 A | * | 12/1990 | Ishigaki et al. ............. 375/140 |
| 5,079,525 A | * | 1/1992 | Ishikawa et al. ............ 332/120 |
| 5,150,377 A | * | 9/1992 | Vannucci ..................... 375/146 |
| 5,535,229 A | * | 7/1996 | Hain et al. .................. 332/120 |
| 6,393,048 B1 | * | 5/2002 | Schuermann et al. ....... 375/140 |

* cited by examiner

Primary Examiner—Chi Pham
Assistant Examiner—Khanh Cong Tran

(57) ABSTRACT

In a digital wireless audio transmission system, a transmitter section includes a local oscillator and frequency modulator to modulate the local oscillator signal with a periodic transmitter spreading signal in order to generate a frequency-modulated radio-frequency signal. An amplitude modulator amplitude-modulates this signal with serial digital data that is generated by an audio interface and a channel encoder. This amplitude-keyed signal which is spread in frequency is then transmitted via a transmit antenna as electromagnetic waves. A receiver section receives these electromagnetic waves via multiple antennae and amplitude-modulates the signal of at least one antenna with antenna modulator signals that have the same frequency as the transmitter spreading signal and a fixed relative phase deviation. All of these antenna signals are then added, and the sum signal is amplified and detected by a small-signal detector. The detection signal is then amplified and low-pass filtered and sampled to result in receiver serial digital data that corresponds to the transmitter serial digital data. This data is then decoded and a digital-to-analog converter generates an analog signal.

10 Claims, 2 Drawing Sheets

DIGITAL WIRELESS AUDIO TRANSMISSION SYSTEM

BACKGROUND OF THE INVENTION

1. Field of the Invention

This invention relates to a wireless audio transmission system, and more particularly to a wireless audio transmission system that transmits audio data digitally via amplitude-keyed microwaves from a transmitter to a receiver.

2. Description of the Related Art

Currently available wireless headphone and loudspeaker systems generally transmit an analog audio signal via frequency-modulated electromagnetic waves or via infrared light. These systems usually have noticeable noise in the received audio signal, low dynamics and high distortion.

This invention transmits the audio signal digitally using electromagnetic waves, thus eliminating those disadvantages of previous systems.

U.S. Pat. No. 5,596,603 describes a system that transmits digital audio data via infrared light. Transmissions via infrared light require visual contact between the transmitter and the receiver and furthermore are prone to interference due to strong light, such as sun light. In U.S. Pat. No. 5,596,603, it is also suggested to transmit audio data using an HF carrier that is timed with the transmission data. Conventional transmission bands at VHF and UHF frequencies, however, don't provide the bandwidth needed to transmit the audio data. Therefore, in the present invention the audio data is transmitted using microwaves where there are frequency bands that have the necessary bandwidth. It is possible to use present invention in conjunction with aforementioned U.S. Pat. No. 5,596,603.

There are several systems that allow wireless transmission of data using microwaves, such as Wireless LAN systems. Also, there are DAB (Digital Audio Broadcast) systems that transmit audio data to portable receivers.

In the case of wireless headphones, such a system has to be of low cost and the receiver has to be of small size and has to have very low current consumption. In addition, such a system has to maintain continuous data transmission without dropouts due to multipath fading.

Multipath fading occurs frequently in indoor environments due to the cancellation of several signal components that are reflected and received by the receiver. This is a major problem in microwave transmission systems due to the short wavelength of the electromagnetic waves which are very well reflected by walls and obstacles.

To solve the problem of multipath fading, there is a variety of known diversity reception systems. One well-known method is the presence of multiple antennae (antenna diversity). Based on various criteria, one of these antennae is selected, thus switching from one antenna to another. Other systems incorporate adjustable phase shifters in order to achieve a constructive addition of these antenna signals or allow to switch the amplification/attenuation of one antenna as described in DE Pat. No. 4,310,256 A1.

Systems that implement switching, however, have a very high bit error rate while they are switching. They are mostly designed for packet-oriented data transmissions but are not suitable for a continuous data transmission such is the case for audio data transmissions.

Also, these systems only switch when a certain lower threshold is reached and thus often receive from an antenna that has the worse signal. Known Wireless LAN systems usually are not capable of maintaining a continuous data transmission. DAB receivers, however, are rather complex systems due to the OFDM transmission technique employed and are not suitable for this application due to high cost, high space requirements and high current consumption.

Therefore, it would be desirable to have a digital wireless audio transmission system of low cost that includes a receiver of low space requirements and low current consumption and that is capable of maintaining a reliable continuous transmission.

SUMMARY OF THE INVENTION

It is, therefore, an object of the invention to provide a system capable of digitally transmitting audio in which both the transmitter and receiver are of low cost.

It is another object of the invention to provide a system that includes a receiver with low space requirements and a low current consumption.

Another object of the invention is to provide a system that is capable of maintaining continuous reliable transmission without dropouts due to multipath fading.

Using a direct conversion receiver as the radio-frequency receiver, provides a solution to the objectives of low cost of the system and low current consumption of the receiver since no local oscillator signal is generated. Also, there is no need for a mixer stage to downconvert the receiver radio-frequency signal or an IF filter or IF amplifier stage for an intermediate-frequency signal. In addition, there is no need for expensive RF shielding due to the fact that no local oscillator is needed which otherwise would be necessary in order to comply with local regulations regarding maximum spurious radiation.

To fulfill the objective of high robustness of the transmission and to minimize the effects of multipath fading, the radio-frequency signal is frequency modulated with a periodic spreading signal and then amplitude modulated with the serial digital data to be transmitted. According to the invention, the frequency of the periodic spreading signal is chosen to be higher than the bit rate of the serial digital data.

To further increase robustness of the transmission, the transmitted signal is received via multiple antennae by the radio-frequency receiver. According to the first aspect of the invention, the receiver radio-frequency signals from these antennae are added via an adder, and the sum signal is amplified and detected by a small-signal detector. It is further suggested to amplitude modulate at least one of the receiver radio signals by an antenna modulator signal that has the same frequency as the transmitter spreading signal and a fixed relative phase deviation.

According to the second aspect of the invention, multiple detection signals from separate radio-frequency receive branches are added and the sum signal is then low-pass filtered and amplified. The small-signal detectors of the individual receive branches are decoupled for radio frequencies.

DESCRIPTION OF THE PREFERRED EMBODIMENT

Figure 1:
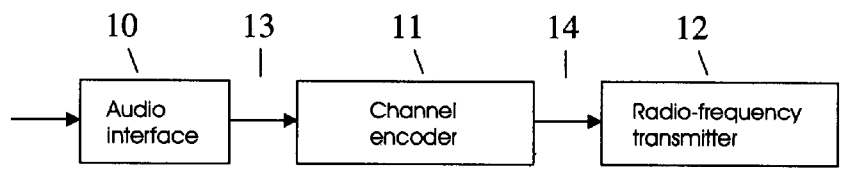
FIG. 1 is a block diagram of the transmitter as provided by the present invention.

Referring to the drawings, FIG. 1 is a block diagram of the transmitter as part of the digital wireless audio transmission system. The audio interface 10 is connected to an audio source and generates digital audio data 13 that represent that audio signal. When used for analog audio sources, the audio interface 10 contains an analog-to-digital converter circuitry that samples the input signal and provides digital audio data. When used for digital audio sources, such as CD players or DAT recorders, the audio interface 10 contains components that allow such sources to be connected.

It is also possible to use an audio interface 10 that allows both an analog and digital input signal. It is suggested to use a switch to select the audio input of such an interface.

The digital audio data 13 provided by the audio interface 10 is then passed to a channel encoder 11 that formats the digital audio data 13 into serial digital data 14 that can be transmitted via a serial channel.

In the radio-frequency transmitter 12, a radio-frequency signal is generated and modulated with the serial digital data 14 provided by the channel encoder 11 and then amplified and transmitted as electromagnetic waves.

Figure 2:
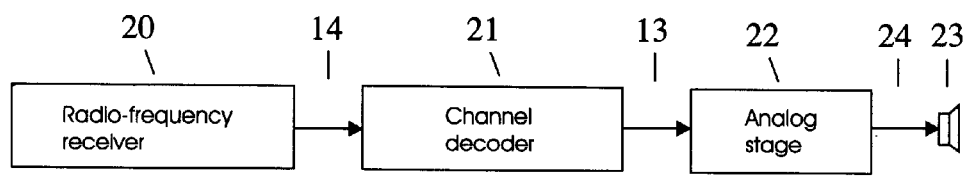
FIG. 2 is a block diagram of the receiver.

FIG. 2 shows a block diagram of the receiver. The electromagnetic waves are received by the radio-frequency receiver 20 and converted to serial digital data 14. The data is passed to a channel decoder 21 that generates the original digital audio data 13. The analog module 22 generates the analog audio signal 24 by digital-to-analog converting and amplifying the digital audio data 13. This analog audio signal 24 is driving the speakers 23.

Figure 3:
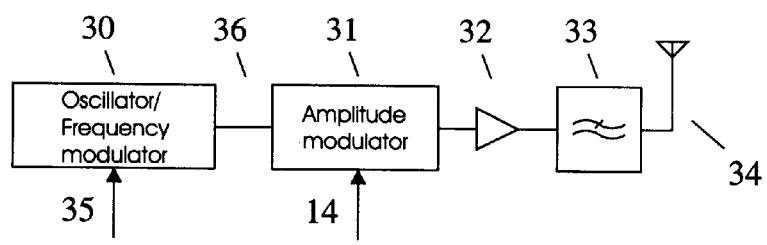
FIG. 3 is a block diagram of the radio-frequency transmitter as part of the transmitter shown in FIG. 1.

FIG. 3 shows a block diagram of the radio-frequency transmitter. A radio-frequency signal is generated and frequency modulated with a periodic transmitter spreading signal 35 by an oscillator/frequency modulator 30. The resulting frequency-modulated radio-frequency signal 36 is then amplitude modulated with the serial digital data 14 by an amplitude modulator 31, amplified by the antenna amplifier 32, low-pass filtered by the low-pass filter 33 and transmitted by the antenna 34. According to the invention, the frequency $f_s$ of the transmitter spreading signal 35 is at least as high as the bit rate of the serial digital data 14.

As a result of the frequency-modulation with the transmitter spreading signal 35, the radio-frequency signal is spread in the frequency domain.

Figure 4:
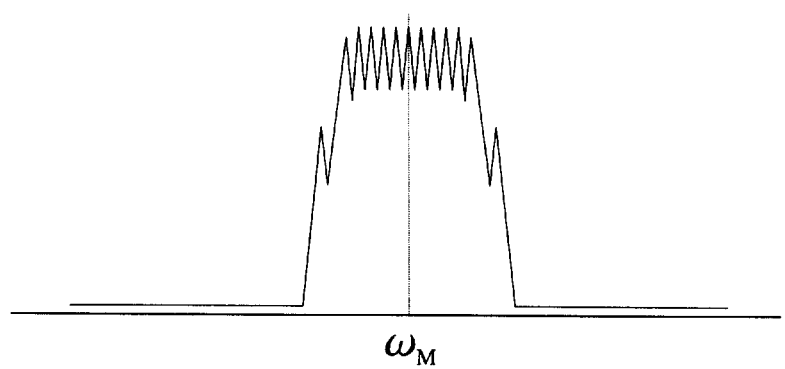
FIG. 4 is a diagram showing a typical frequency spectrum generated by the radio-frequency transmitter as shown in FIG. 3.

FIG. 4 shows a typical spectrum of the transmitted amplitude-keyed radio-frequency signal.

Multipath fading can cause local fades (notches) that are a major problem for narrow-band systems. Due to the high bandwidth of the transmitted signal, a complete fade of the signal due to multipath fading is rather unlikely.

U.S. Pat. No. 4,363,132 describes a method for generating different radio-frequency components by frequency-modulating a radio-frequency signal. The idea is to generate a small number of radio-frequency components that are spaced far apart from each other in the frequency domain in order to achieve a certain diversity order (e.g. 3 or 5). One of these radio-frequency components is then selected in the receiver by a decision circuitry. The signal itself is phase-modulated.

The idea in the present invention, however, is to use the entire transmission bandwidth in order to achieve a maximum frequency modulation index. To achieve a low-cost solution, no band-pass filter is used that isolates one particular spectral component such as described in U.S. Pat. No. 4,363,132. In this case, it can be shown mathematically that the maximum allowable frequency modulation index under the condition of a maximum spurious radiation outside the specified frequency band increases when the frequency of the spreading signal decreases.

The basic principle of this method will be illustrated in the time domain. For the purpose of this illustration, it is assumed that a harmonic signal is used as the transmitter spreading signal. In the time domain, the frequency $f_T(t)$ of the transmitted radio-frequency signal s(t) moves periodically inside the frequency band determined by the maximum frequency deviation $\Delta_F$ and can be expressed as in equation (1). $\Delta_F$ denotes the maximum phase deviation.

$$f_T(t)=f_M+\Delta_F \cdot \cos(2\pi f_S \cdot t)=f_M+\Delta_P \cdot f_S \cdot \cos(2\pi f_S \cdot t) \quad (1)$$

Thus, the radio-frequency signal s(t) can be expressed as in equation (2). k denotes the amplitude modulation index and b(t) the serial digital data, i.e. the baseband signal.

$$s(t)=[1+k \cdot b(t)]\cos(2\pi(f_M+\Delta_F \cdot \cos(2\pi f_S \cdot t))t) \quad (2)$$

In case of no multipath fading, the detection signal in the receiver will be the original baseband signal.

Now it will be assumed that there is a fade within the transmission frequency band around a fade frequency $f_F$. At this frequency, the field strength of the received signal is much lower than at other frequencies within the transmission band. Whenever the radio-frequency signal passes the fading frequency $f_F$, the field strength of the received signal decreases dramatically. If the fading frequency is located at the upper or lower edge of the transmission band, i.e. $f_F=f_M+\Delta_F$ or $f_F=f_M-\Delta_F$, the received signal and therefore the baseband signal will experience a fade once during each period of the spreading signal. If the fading frequency is located inside the transmission band, the received signal will fade twice per period of the spreading signal.

If there are multiple fading frequencies, the received signal will fade at least twice per period of the spreading signal.

Due to fading, the detection signal d(t) which is generated inside the radio-frequency receiver by small-signal detection of the receiver radio-frequency signal is effectively amplitude modulated with a distortion signal e(t) according to equation (3).

$$d(t)=(1+e(t)) \cdot b(t)=b(t)+e(t) \cdot b(t) \quad (3)$$

It follows from the above illustration that the distortion component $e(t) \cdot b(t)$ doesn't contain any frequency components that are smaller than the frequency of the spreading signal $f_s$. Since $f_s$ is chosen to be at least as high as the bit rate (or at least twice as high as the maximum frequency contained in the serial digital data), the distortion component $e(t) \cdot b(t)$ can easily be removed by low-pass filtering the detection signal.

This principle is rather different from known frequency-hopping systems since the spreading frequency is higher than the bit rate, i.e. the frequency changes multiple times during one bit. Frequency-hopping systems, however, transmit multiple bits at each frequency and thus are prone to burst errors which occur during transmission at a fading frequency.

In contrast to aforementioned U.S. Pat. No. 4,363,132, it is useful to use non-harmonic signals as the spreading signal, e.g. a triangular signal.

It is suggested to use a spreading signal with a frequency twice the bit rate of the serial digital data to be able to easily remove the distortion components from the detection signal.

In order to further increase the robustness of the reception, the use of multiple antennae is suggested. The receiver radio-frequency signals of these antennae are added in an adder.

It is further suggested to amplitude-modulate the receiver radio-frequency signal of at least one of these antennae before adding the signals.

Figure 5:
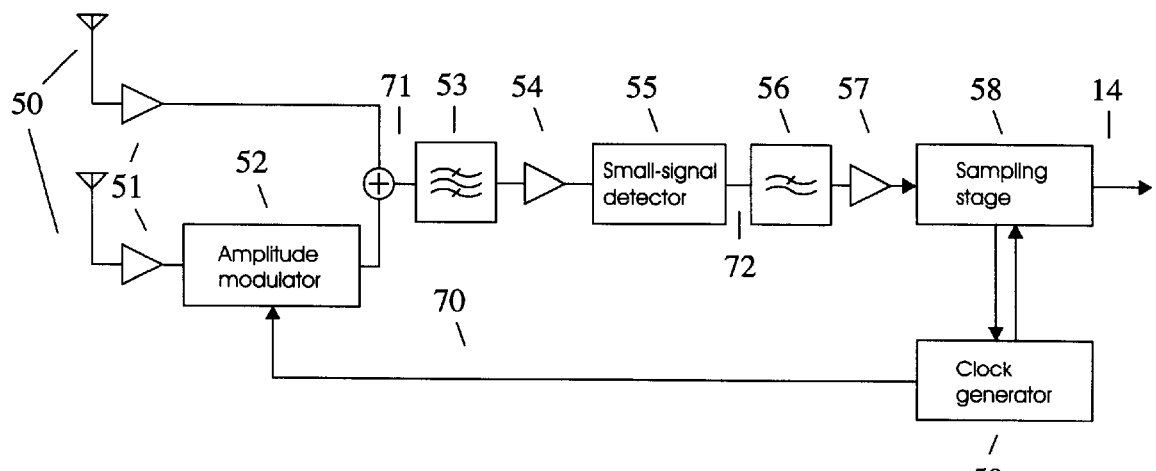
FIG. 5 is a block diagram of the radio-frequency receiver according to the first embodiment of the present invention.

FIG. 5 shows a first embodiment of the radio-frequency receiver that uses two antennae wherein the receiver radio-frequency signal of one antenna is amplitude modulated. In FIG. 5, the electromagnetic waves are received by the two antennae 50 and amplified by the antenna amplifiers 51. The radio-frequency signal of one antenna is amplitude modulated with an antenna modulator signal 70 by an amplitude modulator 52. Both signals are then added and the sum signal 71 is band-pass filtered by a band-pass filter 53, amplified by the amplifier 54 and detected by the small-signal detector 55. The detection signal 72 is then low-pass filtered by the low-pass filter 56 and amplified by the base band amplifier 57. The sampling stage 58 which is clocked by the clock generator 59 recovers the serial digital data 14 that can be processed further.

It is suggested to use a Schottky diode (detector diode) that is forward biased with a current of a few $\mu A$ as the small-signal detector. This arrangement allows for a detector sensitivity of up to $-60$ dBm. Thus, it is possible to design a sensitive enough receiver without encountering difficult stability problems.

To achieve a low-cost solution, it is possible to amplify and amplitude-modulate the receiver radio-frequency signal by a single active element. Thus, there is essentially only one additional active element required per additional antenna.

If a square-wave signal is used as the antenna modulator signal 70, the sum signal 71 will be the first antenna signal during the first half period of the antenna modulator signal and the sum of both antenna signals during the second half period.

A fade at a particular frequency is only possible if the first antenna signal experiences a fade during the first half period and the sum signal experiences a fade during the second half period, i.e. both antenna signals have the same amplitude and have a phase deviation of 180 degrees. It follows that a fade during both half periods of the antenna modulator signal is only possible if the signal amplitude at both antennae is zero.

The sum signal will have distortion components due to the amplitude modulation of the antenna signal. The frequency of the antenna modulator signal has to be high enough to be able to safely remove these distortion components.

If this method is used in conjunction with spreading the radio-frequency signal, it is suggested to use the same frequency for the antenna modulator signal and the transmitter spreading signal and a fixed relative phase deviation of both signals. This can easily be achieved if both of these signals and the bit clock are derived from the same source. In the receiver, the bit clock is recovered by a phase-locked-loop (PLL) circuitry that is used by the sampling stage 58 and controls the local clock generator 59. This arrangement assures that the receiver and transmitter clock and thus the frequency of the antenna modulator signal and the transmitter spreading signal are equal and have a fixed relative phase deviation.

The principle of using the combination of both of these methods will be illustrated, again in the time domain. It is assumed that the transmitter spreading signal and the antenna modulator signal both have the same frequency and a fixed relative phase deviation of 90 degrees.

The radio-frequency signal s(t) moves periodically within the transmission frequency band. By choosing a phase deviation of 90 degrees, s(t) moves from one edge of the transmission band to the other edge, e.g. from the lower edge at $f_M-\Delta_F$ to the upper edge at $f_M+\Delta_F$ in the first half period of the antenna modulation signal during which the signal is received from one antenna only (see equation (1)). During the second half period, s(t) moves back to the first edge, e.g. to $f_{M-\Delta F}$.

If there is a fading frequency inside the transmission bandwidth, the received radio-frequency signal from a system using only one antenna will experience a fade at this frequency both while moving from $f_M-\Delta_F$ to $f_M+\Delta_F$ and while moving from $f_M+\Delta_F$ to $f_M-\Delta_F$. This redundancy is avoided by using two antennae and a phase deviation of 90 degrees between the transmitter spreading signal and the antenna modulation signal thus further increasing robustness of the reception. The sum signal 71 will only totally fade if the field strength of the electromagnetic waves is zero on both antennae at all frequencies within the transmission bandwidth.

Figure 6:
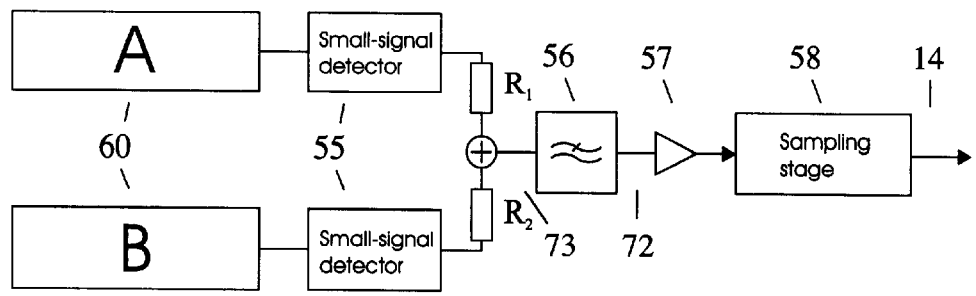
FIG. 6 is a block diagram of the radio-frequency receiver according to the second embodiment of the present invention.

FIG. 6 shows a second embodiment of the radio-frequency receiver which includes two independent receive branches 60. The receiver radio-frequency signals are detected by two independent small-signal detectors 55 and then added. Both small-signal detectors 55 need to be decoupled for radio frequencies. This can be achieved by using two resistors $R_1$ and $R_2$. The sum signal 73 is then low-pass filtered by the low pass filter 56 and amplified by the baseband amplifier 57. The sampling stage 58 recovers the serial digital data 14 from the amplified baseband signal.

Since in the present invention audio is transmitted digitally, the system is able to tolerate much higher levels of interference compared with analog systems without effecting the quality of the audio signal. In order to guarantee reliable audio reception even with high levels of interference, it is suggested to combine the channel encoder with an error correction mechanism.

Since microwaves are attenuated and reflected by walls more than signals at VHF and UHF frequencies, a reliable reception can be achieved even with another user performing transmissions in an adjacent room without the need for frequency coordination. This is possible especially since a fade of the reception signal level below the level of the interfering signal due to multipath fading is rather unlikely because of the suggested method. This phenomenon, however, regularly occurs with conventional analog wireless headphones.

Since the transmitted signal occupies more bandwidth than a comparable narrowband system, the system will have a lower maximum receiver sensitivity. The presented system will typically have a 10 dB lower sensitivity than a comparable narrowband system resulting in a reduction in the maximum possible range by a factor of 3, which however is sufficient for the given purpose.

The present invention allows a high robustness of the transmission and allows the design of low-cost digital audio transmission systems. There is no need for frequency coordination between transmitter and receiver and thus there is no need for channel selector means and a radio-frequency receiver PLL.

The suggested system also has a high degree of robustness against interference from other systems that transmit in the microwave frequencies since most of these systems use phase or frequency modulation and thus don't contain any amplitude-modulated components.

What is claimed is:

1. A digital audio transmission system comprising:

a stationary transmitter section including:

interface means for receiving a signal from an audio source and generating transmitter digital audio data to represent that signal;

channel encoding means for generating transmitter serial digital data based on said transmitter digital audio data;

radio-frequency transmitter means including radio-frequency oscillator and frequency modulation means for generating a radio-frequency signal that is frequency-modulated with a periodic transmitter spreading signal wherein the frequency of said transmitter spreading signal is at least as high as the bit rate of said transmitter serial digital data, and transmitter amplitude modulation means for amplitude-modulating said frequency-modulated radio-frequency signal with said transmitter serial digital data resulting in an amplitude-keyed radio-frequency signal that is spread in frequency; and transmitter antenna means for transmitting said amplitude-keyed radio-frequency signal as electromagnetic waves;

and a receiver section including:

radio-frequency receiver means including receiver antenna means for receiving said electromagnetic waves and resulting in a receiver radio-frequency signal, amplifier means for amplifying said receiver radio-frequency signal, and data recovery means for generating receiver serial data corresponding to said transmitter serial data;

channel decoding means responsive to said receiver serial digital data for generating receiver digital audio data equal to said transmitter digital audio data; and digital-to-analog converter means for generating an analog signal based on said receiver digital audio data.

2. A system according to claim 1 wherein said radio-frequency receiver means operate as a direct conversion receiver and said data recovery means include:

small-signal detection means including at least one non-linear element for small-signal detecting the amplified receiver radio-frequency signal wherein said small-signal detection means have a detection sensitivity higher than −30 dBm, thereby generating a detection signal;

baseband means for low-pass filtering and amplifying said detection signal and thereby generating a baseband signal; and sampling means for sampling said baseband signal in order to generate receiver serial data.

3. A system according to claim 1 wherein the maximum phase deviation of said frequency-modulated radio-frequency signal is higher than 3.

4. A system according to claim 1 wherein said transmitter spreading signal has a frequency that is twice as high as the bit rate of said transmitter serial digital data.

5. A system according to claim 1 wherein said radio-frequency receiver means include multiple receiver antenna means for receiving said electromagnetic waves and generating multiple receiver radio-frequency signals and adding means for adding said receiver radio-frequency signals.

6. A system according to claim 5 wherein said radio-frequency receiver means further include receiver amplitude modulation means for amplitude-modulating at least one of said receiver radio-frequency signals with antenna modulator signals resulting in receiver amplitude-modulated radio-frequency signals which are added by said adding means.

7. A system according to claim 6 wherein said antenna modulator signals are derived from the bit clock generated by said sampling means and all antenna modulating signals have the same frequency as said transmitter spreading signal and a fixed relative phase deviation.

8. A system according to claim 7 wherein two receiver antenna means are used for receiving said electromagnetic waves thus resulting in two receiver radio-frequency signals and one of these receiver radio-frequency signals is amplitude modulated with an antenna modulator signal by said receiver amplitude modulation means and said antenna modulator signal has the same frequency as said transmitter spreading signal and said antenna modulator signal and said transmitter spreading signal have a fixed phase deviation of 90 degrees.

9. A system according to claim 1 wherein said radio-frequency receiver means include multiple small-signal detection means for generating multiple detection signals and adding means for adding said detection signals.

10. A system according to claim 1 wherein said receiver section is incorporated into a headphone in order to allow mobile reception of an audio signal.

* * * * *